United States Patent [19]

Stape

[11] 4,451,120
[45] May 29, 1984

[54] CHIMNEY OBSTRUCTION DETECTION APPARATUS

[76] Inventor: Frank R. Stape, P.O. Box 379, Bartlett, Ill. 60103

[21] Appl. No.: 388,518

[22] Filed: Jun. 15, 1982

[51] Int. Cl.³ .............................................. G02B 7/18
[52] U.S. Cl. ..................................... 350/319; 350/308
[58] Field of Search ............... 350/319, 308, 486; 356/241, 438, 439

[56] References Cited

U.S. PATENT DOCUMENTS 2,408,495 10/1946 Wager ................. 356/439
2,852,979 9/1958 Hund .................. 350/308

FOREIGN PATENT DOCUMENTS 0145432 12/1980 Fed. Rep. of Germany ...... 356/241

Primary Examiner—John K. Corbin
Assistant Examiner—Lynn Vandenburgh
Attorney, Agent, or Firm—Paul Kerstein

[57] ABSTRACT

An inspection apparatus for furnace flues and chimneys includes a reflecting plate biasly coupled, at its lower end to an interior wall of the flue. The reflecting plate is urged, by the bias coupling, to a non-use position adjacent the interior wall of the flue. The plate is moved to its reflecting or use position, within the interior of the flue, by the movement of a connecting rod operatively connected to the reflecting plate. In the reflecting plate use position, light entering the flue from the top is reflected to a sight glass in the flue wall. The absence of reflected light from the reflecting plate indicates an obstruction of the flue.

Also disclosed is a modular inspection device for use with existing furnace flues.

16 Claims, 4 Drawing Figures

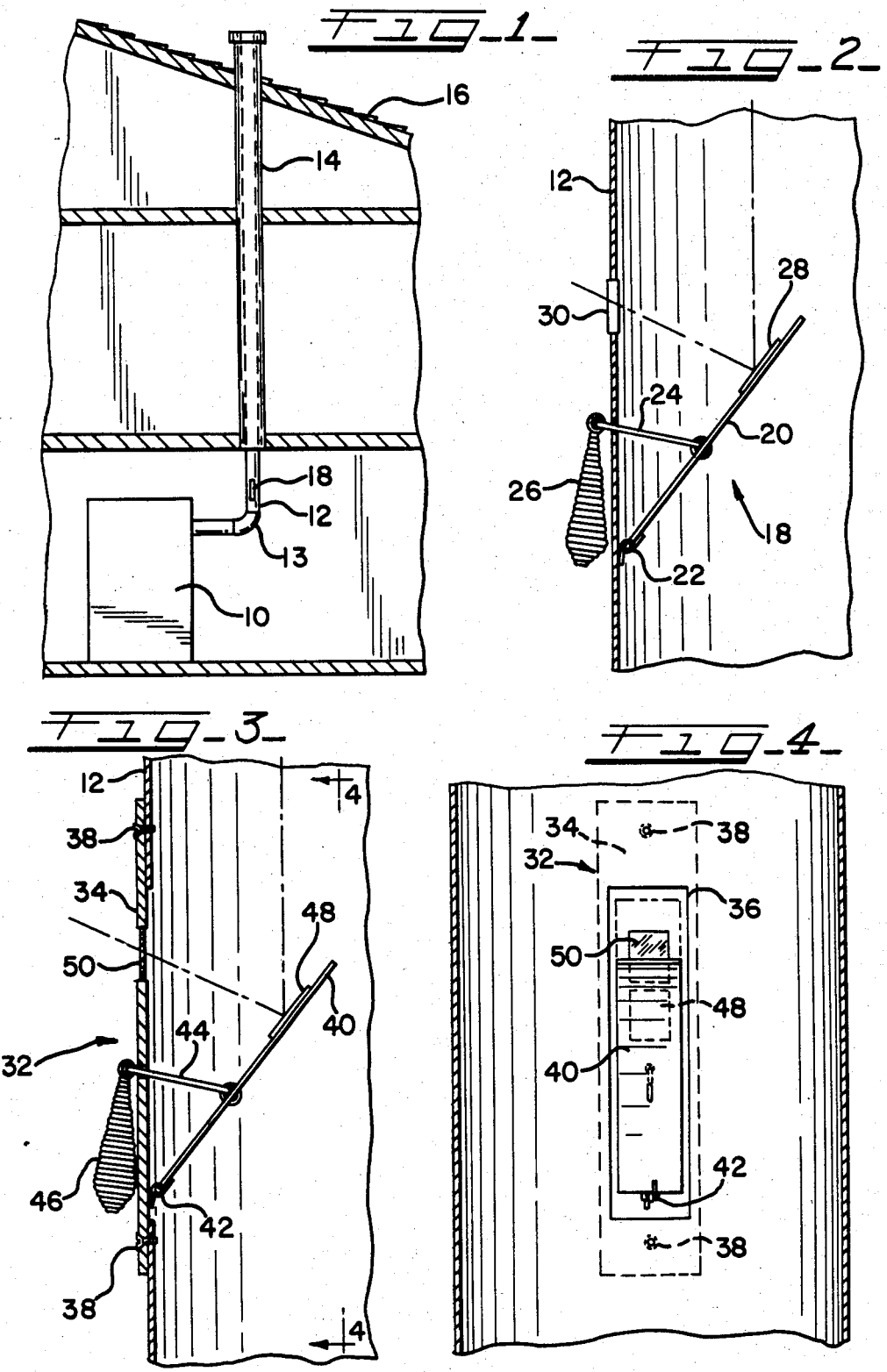

CHIMNEY OBSTRUCTION DETECTION APPARATUS

BACKGROUND OF THE INVENTION

The present invention relates to a new and improved device for the inspection of chimneys and furnace flue pipes.

It has been recognized that the world's supply of fossil fuels for the production of energy is being exhausted at ever increasing rates. This realization has resulted in an energy crisis where existing fuels are being utilized more efficiently and alternative fuels are being developed.

Energy conservation, efficient use of all available existing fuels, and development of new fuels are all an important part of the solution to the energy crisis. Up until now, there has been no serious consideration given to the safety of home occupants utilizing fuels for the generation of energy requirements for the home. The majority of the home's energy requirements for heat and hot water is supplied by a fuel fired furnace, fireplace or the like.

In the use of fuels for the production of heat and hot water, dangerous gaseous combustion by-products are given off which must be vented to prevent asphyxiation of the home's occupants. In venting the harmful combustion by-products, a network of pipes direct the by-products to a chimney and ultimately outdoors. It is therefore extremely imperative that the path through the pipes and chimney to the outside be free from obstruction to prevent the backup and accumulation of harmful gaseous by-products within the home. These gases are usually colorless and odorless yet deadly. Therefore the gases are not readily detectable or indicative of an obstruction until it is too late.

Blockage of pipes and chimneys can occur due to a variety of obstructions. External sources such as birds nesting in the chimney or animals becoming disabled and lodged in the chimney can cause blockage. Internal sources such as the build-up of residue on the interior walls of pipes can restrict the flow of gases therethrough. The present invention, therefore, provides a device for the inspection of pipes and chimneys to permit viewing of the interior of the pipes to allow for the discovery of obstructions. This inexpensive inspection device can locate the blockage thereby saving lives of the home's occupants.

SUMMARY OF THE INVENTION

The present invention provides a new and improved apparatus for the detection of obstructions of furnace flues, chimneys or the like. The new inspection apparatus is an easy, convenient and inexpensive way to check for obstructions, thereby preventing needless deaths. The apparatus is readily compatible with existing furnace flue pipes and is easily mounted thereon. In new construction, the apparatus can be manufactured into that portion of the furnace flue that presents easy access thereto.

The inspection apparatus of the present invention includes a reflecting plate situated within the interior of the furnace, chimney or other flue pipe to reflect incoming light from the top of the flue to a sight glass in the flue pipe wall. The reflecting plate is biasly coupled at its lower end to an interior wall of the flue pipe and is urged to a non-use position adjacent the wall. The reflecting plate is connected to a connecting rod that extends through the flue pipe and is pivotally coupled to the reflecting plate. A handle is pivotally coupled to the connecting rod exteriorly of the pipe and is used to apply force on the connecting rod to move the reflecting plate, against the force of the bias coupling, to its reflecting or use position within the interior of the pipe.

Once the reflecting plate is moved to its use position, one can check, through the sight glass, for any obstructions in the flue pipe. The absence of light, which can be detected by viewing the reflecting plate through the sight glass, in an indication of an obstruction. Further, the pivotal connections of the handle to connecting rod to reflecting plate allows the handle and connecting rod to lie adjacent the exterior wall of the flue pipe and out of the way when the reflecting plate is in the non-use position.

The inspection apparatus disclosed above can also be used in existing flue pipes by a modular device inserted over a cutout in the pipe. The modular inspection device includes the same features as above but also has a mounting member which is adapted to be secured over the cutout in the flue pipe. The reflecting plate is biasly coupled, at its lower end, to the mounting member and the connecting rod extends through the mounting member.

BRIEF DESCRIPTION OF THE DRAWINGS

FIG. 1 represents an environment within which the apparatus of the subject invention can be practiced;

FIG. 2 is a side plan view in section of a flue inspection apparatus configured in accordance with a first embodiment of the present invention;

FIG. 3 is a side plan view in section of a flue inspection apparatus configured in accordance with an alternative embodiment of the present invention;

FIG. 4 is a front view of a furnace flue pipe showing the cutout for receiving the alternative embodiment of the present invention, which is shown in phantom.

DETAILED DESCRIPTION

In accordance with the present invention the new and improved inspection apparatus and modular inspection apparatus shall now be described with respect to the drawings.

Referring to FIG. 1 there is shown a typical environment within which the present invention can be practiced. A home heating plant or furnace 10 is vented to direct harmful combustion by-products, produced while meeting the home's energy requirements, outdoors. The combustion by-products flow from the furnace 10, through a furnace flue pipe 12, which can include an elbow 13, to a chimney 14. The chimney 14 extends past the roof 16 to effect efficient exhausting of the by-products. Further, the chimney 14 is usually of a multi-constructed, insulated type within interior portions of the home, such as between walls, ceilings and the like. The furnace flue pipe 12 is usually constructed out of sheet metal and incorporates the inspection apparatus 18 of the present invention, within easy access to a user.

The inspection apparatus 18 is best shown in FIG. 2. In this embodiment, the inspection apparatus 18 can be constructed as an integral part of the furnace flue 12. The apparatus 18 includes a reflecting plate 20 which is coupled, at its lower end portion, by a spring-loaded hinge 22 to the interior wall of pipe 12. The hinge 22 biasly urges plate 20 to a non-use position adjacent the interior wall of pipe 12.

A connecting rod 24 extends through the pipe 12 and is pivotally coupled, at one of its ends, to plate 20. A handle 26, which can be a wire handle or the like, is pivotally coupled to the other end of the connecting rod 24 exteriorly of pipe 12. The pivotal connections of the handle 26 to the connecting rod 24, to the plate 20 allows the rod 24 and handle 26 to lie adjacent the exterior wall of pipe 12, out of the way until needed.

Movement of the connecting rod 24 against the force created by hinge 22, moves the plate 20 from its non-use position, to a use position within the interior of pipe 12. This movement is accomplished by grabbing and pushing the handle 26 toward the pipe 12. Once in the use position the plate 20, with a reflecting surface 28 thereon, is able to reflect light entering through the top of chimney 14 to a sight or watch glass 30 in pipe 12. The sight glass 30 is preferably constructed of a heat-tempered, clear, non-fogging glass to permit safe, clear viewing therethrough. The sight glass 30 can also be sealing removable with respect to the pipe 12 for ease of cleaning and replacement. The sight glass can form a threaded or notch-type connection with the pipe 12. In viewing the reflecting plate 20 in its use position through sight glass 30, one can detect an obstruction in chimney 14 by the absence of reflected light. This simple, inexpensive device provides an easy way of detecting obstructions in chimneys which can cause the backup of harmful gases into the home.

A modular inspection apparatus 32 that can be used in existing flue pipes is shown mounted to flue pipe 12 in FIG. 3. The apparatus 32 is placed in an easily accessible place such as is shown in FIG. 1. In existing construction, where the elbow 13 is situated in close proximity to chimney 14, to preclude the placement of apparatus 32 within pipe 12, the apparatus can be fitted in a pipe connected to elbow 13 in a "tee" configuration. The apparatus 32 includes a mounting member 34 adapted to cover a cutout or opening 36 in pipe 12. The member 34 is secured to pipe 12, over the cutout 36, by any known fasteners 38 such as sheet metal screws or the like. FIG. 4 indicates the respective positions of the apparatus 32 with respect to the cutout 36 of pipe 12.

Turning again to FIG. 3 a reflecting plate 40 is biasly coupled, at its lower end portion, by a spring-loaded hinge 42 to the member 34. The hinge 42 urges plate 40 to a non-use position adjacent the mounting member 34. A connecting rod 44 extends through member 34 and is pivotally coupled, at one of its ends, to plate 40 on one side of member 34. A handle 46, which can be a wire handle or the like, is pivotally coupled to the other end of the connecting rod 44 on the other side of the member 34. The pivotal connections described above allow the connecting rod 44 and handle 46 to lie substantially adjacent to the other side of the mounting member 34 when the plate 40 is in a non-use position.

Once the modular inspection apparatus 32 is mounted on pipe 12, as shown in FIGS. 3 and 4, its operation is similar to that described with respect to the inspection apparatus 18. Movement of the connecting rod 44 toward the plate 40 thereby moves the plate 40 against the force created by hinge 42 from its non-use position to a use position within the interior of the pipe 12. Once the plate 40 is in the use position, it is able to reflect light entering the chimney from its reflecting surface 48 to a sight glass 50 in the mounting member 34. The sight glass 50 is of the same type as the sight glass 30 hereinabove described. Therefore, obstructions can be detected by the absence of light being reflected off the reflecting plate 40 to the sight glass 50 when the plate 40 is moved to its use position.

The apparatus 18 and modular apparatus 32 of the present invention provide an inexpensive, simple and easy device for the detection of obstructions in flues and chimneys. The invention is extremely advantageous in that obstructions of chimneys, which can cause the backup of odorless, colorless, deadly gases into the home without detection, are now easily detectable. Further, the invention can be adapted to existing structures or manufactured into new structures.

Modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An inspection apparatus for the detection of obstructions of furnace flue pipes having a hollow portion therein for venting of flue gases, the improvement comprising:

plate means sealed within said hollow flue pipe portion operatively coupled at it's lower end portion with the interior of said flue pipe for reflecting light entering said hollow flue pipe portion through said flue pipe's upper end portion while said plate means is in a use position and said plate means being movable from a non-use position adjacent an interior wall of said flue pipe out of the way of venting flue gases to a use position within said hollow flue pipe portion forming an acute angle with said flue pipe;

moving means, pivotally coupled to said plate means, through said flue pipe, for moving said plate means from said non-use position out of the way of venting flue gases to said use position allowing said moving means to be in a plane adjacent the exterior of said flue pipe when said plate means is in said non-use position; and sight means in said flue pipe, sealing said flue pipe, for viewing light entering said hollow portion through said upper end portion and reflected by said plate means when in said use position thereby enabling detection of an obstruction of said flue pipe.

2. The apparatus as defined in claim 1, wherein biasing means operatively couples said plate means to said interior flue pipe wall for biasing said plate means to said non-use position out of the way of venting flue gases.

3. The apparatus as defined in claim 2, wherein said plate means includes a highly reflective surface for reflecting light entering said flue pipe at its upper end portion to said sight means when said plate means is in said use position.

4. The apparatus as defined in claim 3, wherein said sight means includes a transparent, heat-tempered, sight glass.

5. The apparatus as defined in claim 4, wherein said sight means is sealingly removable with said flue pipe for ease of cleaning.

6. The apparatus as defined in claim 4, wherein said sight means is a non-fogging sight glass.

7. The apparatus as defined in claim 2, wherein said moving means includes a connecting rod extending through said flue pipe wall and coupled to said plate means;
and
said moving means further includes a handle coupled to said connecting rod exteriorly of said flue pipe.

8. The apparatus as defined in claim 7, wherein
said connecting rod is pivotally coupled to said plate means and to said handle to allow said connecting rod and said handle to lie in a plane adjacent the exterior of said flue pipe when said plate means is in said non-use position.

9. A modular inspection apparatus for the detection of obstructions of furnace flue pipes, the improvement comprising:
a mounting member lying in the same plane and adjacent to a wall of said flue pipe adapted to be secured and seal an opening in a flue pipe;
plate means for reflecting light incident thereon, operatively coupled at its lower end portion to said mounting member and being movable from a non-use position adjacent said mounting member out of the way of venting flue gases to a use position wherein said plate means forms an acute angle with said mounting member;
moving means, pivotally coupled to said plate means through said mounting member, for moving said plate means from said non-use position out of the way of venting flue gases to said use position allowing said moving means to lie in a plane adjacent the exterior of said mounting member and flue pipe when said plate means is in said non-use position; and
sight means, in said mounting member, for viewing light reflected from said plate means when said plate means is in said use position.

10. The modular apparatus as defined in claim 9, wherein
biasing means operatively couples said plate means to said mounting member for biasing said plate means to said non-use position.

11. The modular apparatus as defined in claim 10, wherein
said plate means includes a highly reflective surface for reflecting light to said light means when said plate means is in said use position.

12. The modular apparatus as defined in claim 11, wherein
said sight means includes a transparent, heat-tempered, sight glass.

13. The apparatus as defined in claim 12, wherein
said sight means is sealingly removable with said flue pipe for ease of cleaning.

14. The apparatus as defined in claim 12, wherein
said sight means is a non-fogging sight glass.

15. The modular apparatus as defined in claim 10, wherein
said moving means includes a connecting rod extending through said mounting member and coupled to said plate means on one side of said mounting member; and
said moving means further includes a handle coupled to said connecting rod on the other side of said mounting member.

16. The modular apparatus as defined in claim 15, wherein
said connecting rod is pivotally coupled to said plate means and to said handle to allow said connecting rod and said handle to be in a plane adjacent the other side of said mounting member when said plate means is in said non-use position.

* * * * *